US009733865B2

United States Patent
Katori et al.

(10) Patent No.: US 9,733,865 B2
(45) Date of Patent: Aug. 15, 2017

(54) DELAY MECHANISM ON FIBRE CHANNEL

(71) Applicant: International Business Machines Corporation, Armonk, NY (US)

(72) Inventors: Katsuyoshi Katori, Kawasaki (JP); Yutaka Oishi, Kawasaki (JP); Eiji Tosaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 14/830,842

(22) Filed: Aug. 20, 2015

(65) Prior Publication Data
US 2017/0052735 A1    Feb. 23, 2017

(51) Int. Cl.
G06F 3/06         (2006.01)
G06F 12/0897      (2016.01)
G06F 13/40        (2006.01)

(52) U.S. Cl.
CPC ............ *G06F 3/0656* (2013.01); *G06F 3/061* (2013.01); *G06F 3/0653* (2013.01); *G06F 3/0673* (2013.01); *G06F 12/0897* (2013.01); *G06F 13/4068* (2013.01); *G06F 2212/60* (2013.01)

(58) Field of Classification Search
CPC ...... G06F 3/0656; G06F 3/061; G06F 3/0653; G06F 12/0897; G06F 12/4068
See application file for complete search history.

(56) References Cited

U.S. PATENT DOCUMENTS

| 6,338,083 | B1 | 1/2002 | Casper et al. | |
|---|---|---|---|---|
| 7,895,352 | B2 | 2/2011 | Ageyev et al. | |
| 2009/0193140 | A1* | 7/2009 | Ageyev ................ | G06F 15/16 709/235 |
| 2012/0246455 | A1* | 9/2012 | Aloni .................... | G06F 8/67 713/2 |

OTHER PUBLICATIONS

Pat Artis, H., "Understanding FICON Channel Path Metrics," Conference: 29th International Computer Measurement Group Conference, Proceedings, Dec. 2003, pp. 1-14, © 2003 Performance Associates, Inc.
Unknown, "FICON Over Extended Distances," MainFrame White Paper, Brocade, pp. 1-7, © 2007 Brocade Communications Systems, Inc. http://www.brocade.com/downloads/documents/white_papers/FICON_over_ExDist_WP_01.pdf.
Unknown, "StorageTek Virtual Storage Manager System," Oracle Data Sheet, pp. 1-5, Copyright © 2013 http://www.oracle.com/us/products/servers-storage/storage/tape-storage/033620.pdf.

(Continued)

*Primary Examiner* — Ryan Bertram
(74) *Attorney, Agent, or Firm* — Mark G. Edwards

(57) ABSTRACT

A method can include transmitting a first data from a first adapter to a buffer of a channel adapter device driver at a buffer memory transfer rate. The channel adapter device driver also receives a second data at a first port of the first adapter from a host at a first time. The method also includes determining a second time to send a device end status to the host, the device end status closes a channel from the host to the first adapter. The method also includes sending the device end status to the host at the second time through the first port. The method also includes transferring the second data from the first adapter to the buffer of the channel adapter device driver.

17 Claims, 8 Drawing Sheets

(56) References Cited

OTHER PUBLICATIONS

Xu et al., "Evaluation for TCP with Delayed ACK Option in Wireless multi-hop Networks," IEEE 54th Vehicular Technology Conference, VTC Fall 2001, pp. 267-271, © 2001 IEEE. DOI: 10.1109/VTC.2001.956599.

Unknown, "High Performance FICON," Technical white paper, Hewlett-Packard Development Company, pp. 1-13, 4AA2-4749ENW, Apr. 2014, Rev. 4, © 2014 Hewlett-Packard Development Company.

Unknown, "Why Switched FICON? (Switched FICON vs. Direct-Attached FICON)," MainFrame White Paper, Brocade, pp. 1-12, © 2011 Brocade Communications Systems, Inc.

Mell et al., "The NIST Definition of Cloud Computing," National Institute of Standards and Technology, Special Publication 800-145, Sep. 2011, 7 pages.

Coyne et al., "IBM TS7700 Virtualization Engine with R3.2," IBM Redbooks, Aug. 2015, Third Edition, 964 pages. http://www.redbooks.ibm.com/redbooks/pdfs/sg248122.pdf.

* cited by examiner

DELAY MECHANISM ON FIBRE CHANNEL

BACKGROUND

The present disclosure relates in general to data transferring, and more particularly to transfer speed regulating.

Computer systems may include a host which is connected to a computer subsystem, such as a computer storage subsystem. The host may store and access data from the computer storage subsystem over a communications channel having a maximum throughput. Generally, the throughput is measured in data passed through the channel per a certain time period, such as bytes-per-second (B/sec). Computer storage subsystems may include a variety of components such as virtual tape storage systems, where hard disk drive storage is used to emulate tape drives and tape cartridges. In other storage subsystems, hard disk drives may be configured in a redundant array of independent disks (RAID) typology.

SUMMARY

According to embodiments of the present disclosure, a method, system, and computer program product for managing a delay in a fibre channel adapter is presented.

The method can include transmitting a first data from a first adapter to a buffer of a channel adapter device driver at a buffer memory transfer rate. The channel adapter device driver aggregates data from at least the first adapter and a second adapter to send to a disk cache in a hierarchal storage management system. The channel adapter device driver also receives a second data at a first port of the first adapter from a host at a first time. The method also includes determining a second time to send a device end status to the host, the device end status closes a channel from the host to the first adapter. The method also includes sending the device end status to the host at the second time through the first port. The method also includes transferring the second data from the first adapter to the buffer of the channel adapter device driver.

The system can include a processor, and a memory. A control unit is communicatively coupled to the processor and memory. The control unit is configured to transmit a first data from a first adapter to a buffer of a channel adapter device driver at a buffer memory transfer rate. The channel adapter device driver aggregates data from at least the first adapter and a second adapter to send to a disk cache in a hierarchal storage management system. The control unit is configured to receive a second data at a first port of the first adapter from a host at a first time. The control unit is configured to determine a second time to send a device end status to the host, the device end status closes a channel from the host to the first adapter. The control unit is configured to send the device end status to the host at the second time through the first port. The control unit is configured to transfer the second data from the first adapter to the buffer of the channel adapter device driver.

The computer program product for managing a fibre channel adapter includes a computer readable storage device having a computer readable program stored therein, wherein the computer readable program, when executed on a computing device, causes the computing device to transmit a first data from a first adapter to a buffer of a channel adapter device driver at a buffer memory transfer rate, the channel adapter device driver aggregates data from at least the first adapter and a second adapter to send to a disk cache in a hierarchal storage management system. The computer readable program causes the computing device to receive a second data at a first port of the first adapter from a host at a first time. The computer readable program causes the computing device to determine a second time to send a device end status to the host, the device end status closes a channel from the host to the first adapter. The computer readable program causes the computing device to send the device end status to the host at the second time through the first port. The computer readable program causes the computing device to transfer the second data from the first adapter to the buffer of the channel adapter device driver.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
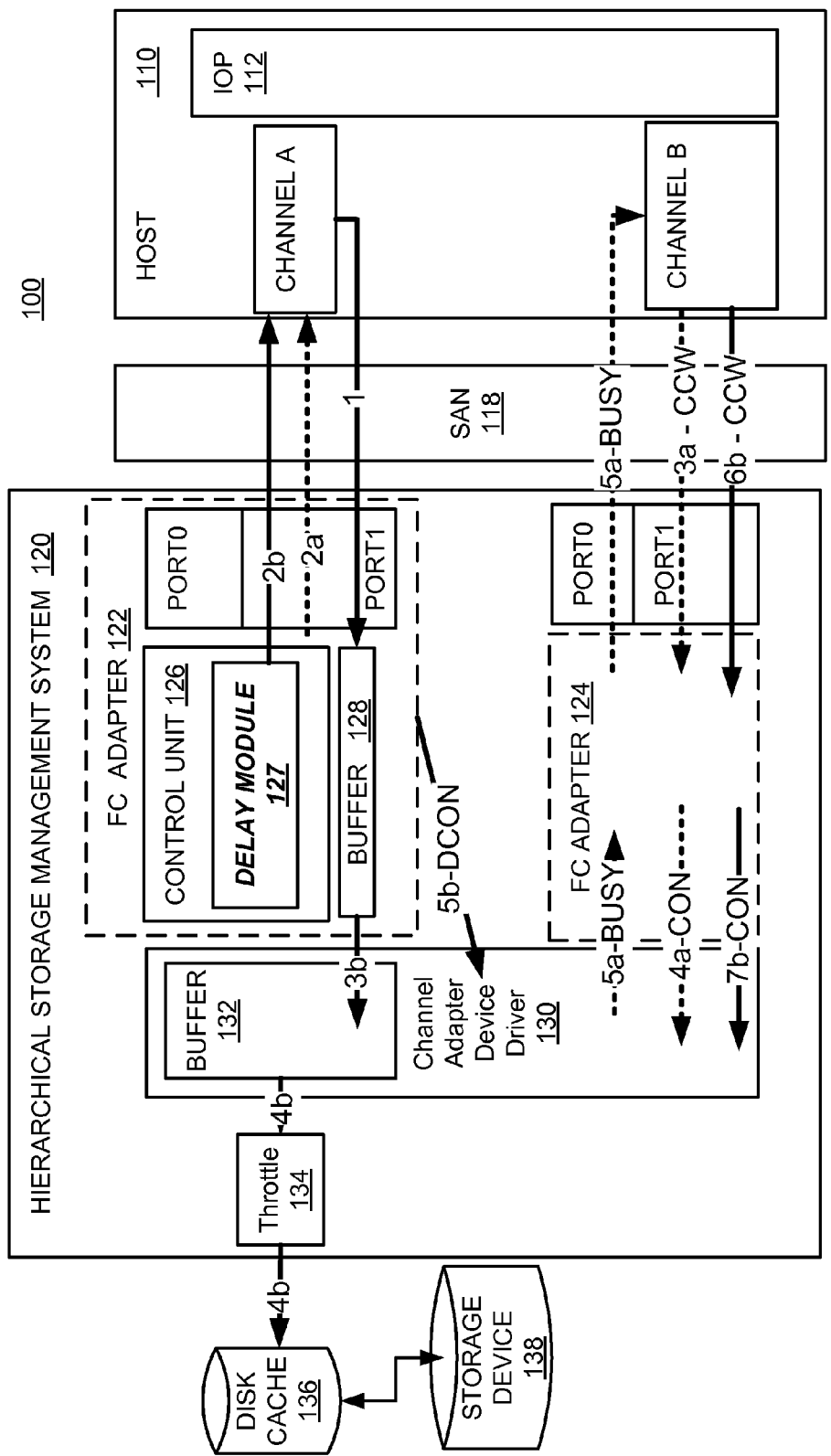
FIG. 1 illustrates a system that includes a host forming a communication channel with a hierarchical storage management system, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates in general to data transferring, and more particularly to transfer speed regulating. For instance, the present disclosure relates to introducing a time-based delay to an end signal within a fibre connection. The delay can reduce the frequency that a busy status message is returned from the hierarchical storage management system when a different channel of a host accesses a hierarchical storage management system. The delay mechanism may maintain the transfer rate from a fibre channel (FC) adapter to a storage device under commonly experienced conditions. While the present disclosure is not necessarily limited to such applications, various aspects of the disclosure may be appreciated through a discussion of various examples using this context.

In various embodiments of the present disclosure, the timing of a fibre channel (FC) adapter returning a Device End status to a host is changed based on the rate of data transfer from a buffer memory of the FC adapter to a buffer on a Channel Adapter Device Driver (CADD). More specifically, when it is predicted that transfer from the buffer memory of the FC adapter to the buffer of the CADD does not end during a period between the time point of the FC adapter returning a Device End status to the host and the time point when the next CCW is thought to reach the adapter from the host, the timing of the adapter returning the Device End status to the host is delayed. Consequently, a Busy status returned by the hierarchical storage management system during "migration" is reduced without influencing performance (e.g., a transfer rate) during times when migration is not occurring. The process of deleting data in a disk cache after that data has been copied to tape is called migration.

Various embodiments include transferring data to one or more storage devices in a hierarchical storage management system from a host. The hierarchical storage management system involves the management of different storage devices with different transfer speeds. The hierarchical storage management system can include a management system to virtualize various storage devices. For example, the hierarchical storage management system can include tape drives, hard drives, and solid state devices. The various storage devices can be tiered. The host can include any system that accesses the hierarchical storage management system. The host can communicate via channels, e.g., a fibre channel connection, with the hierarchical storage management system. The hierarchical storage management system can include IBM® (owned by International Business Machines, Inc.) Virtualization Engine TS7700 (hereinafter referred to as TS7700) which uses the FICON® (Fibre Channel Connection) protocol (FICON is owned by International Business Machines, Inc.) for communication.

Various descriptions of components will be made on TS7700, although the present disclosure is applicable to other hierarchical storage management systems. Reference will also be made to FICON® protocol but aspects of the disclosure are also applicable to the Fibre Channel protocol (e.g., FC4). In general, a hierarchical storage management system has multiple adapters (e.g., FICON 0, FICON 1, . . . ) and each FC adapter has multiple ports (e.g., Port 0, Port 1, . . . ). Firmware mounted on each FC adapter independently operates on the adapter and may be updated on an on-going basis. Each FC adapter may additionally have a buffer memory with a capacity of about 1 GB, which is called an SBM (Sequence Buffer Memory). Each FC adapter is managed by a device driver called a CADD (Channel Adapter Device Driver) operating on the hierarchical storage management system. Although reference is made to an FC adapter, the term adapter and FC adapter may be used interchangeably throughout this disclosure. Additionally, a FICON® adapter is a type of FC adapter which is configured to use the FICON® standard.

FIG. 1 illustrates a system 100 of a host 110 forming a communication channel with a hierarchical storage management system 120. For example, the host 110 can be accessing a virtualized tape drive which exists as part of a hierarchical storage management system 120. The host 110 can have various input/outputs (IOPs) 112 that transmit data from the IOP 112 to the hierarchical storage management system 120. The host 110 can initiate various channels (e.g., channel A and channel B) that communicate with various adapters on the hierarchical storage management system 120. In various embodiments, the host may operate z/OS™ (owned by International Business Machines, Inc.) and interact with one or more users. The hierarchical storage management system 120 can be a virtualization engine such as the IBM® TS7700 where various virtual storage devices (e.g., tape drives) are provided to the host 110 based on one or more storage devices (e.g., 138). For example, storage device 138 can be provided to the host 110 as a virtual tape drive. The hierarchical storage management system 120 can include a fibre channel (FC) adapter 122, and FC adapter 124. An example of a FC adapter can also include a FICON® adapter using the ANSI FC-SB-3 Single-Byte Command Code Sets-3 Mapping Protocol operating in FC layer 4. An FC adapter (e.g., 122, or 124) can include a control unit e.g., 126, and a buffer memory, e.g., 128. The control unit 126 can communicate with various channels on the host 110. The buffer 128 can temporarily store data from the host 110. The buffer 128 may be referred to as a buffer memory. In various embodiments, the buffer 128 may be a sequence buffer memory or a multi-buffer memory. Aspects of the present disclosure may apply to both an adapter configured to use a sequence buffer memory or a multi-buffer memory.

For instance, at the time of writing data to the hierarchical storage management system 120 from the host 110, the FC adapter 122 stores the data received from the host 110 into the buffer 128 once and sends the data to the storage device 138 from the buffer 128 via the CADD 130 (including the buffer 132). The CADD 130 can facilitate movement of data from the host to a virtualized storage device. The storage device 138 can be a device used for storage and may include a hard drive, solid state disk, a tape drive, flash memory, etc. The storage device 138 may receive data from the disk cache 136. The disk cache 136 may act as an intermediary within a hierarchical storage management system 120 and facilitate premigration (which is the process of copying data to tape that only exists in cache). For example, a more frequently accessed temporary storage device such as a hard drive or solid state disk may write to a tape drive or a buffer or disk cache may also write to the tape drive. In various embodiments, the disk cache 136 can be independent from the FC adapter 122 or be a part of DS3500™ (owned by International Business Machines, Inc.), DS5020™ (owned by International Business Machines, Inc.) or something itself which is part of DS7700™ (owned by International Business Machines, Inc.). Due to the slower write times to a tape drive, the temporary storage device may store both data to be written to the tape drive and frequently accessed data that is not appropriate for long-term storage on the tape drive. Data transfer can be regulated using a throttle 134, which can slow down data transfer from the CADD 130.

Using the buffer 128 can allow the FC adapter 122 to perform FICON® protocol processing for communications with the host 110 and transfer of the data to the storage device 138 asynchronously. The data sent to the CADD 130 is stored into a disk cache 136 which can be RAID-configured with multiple hard drives. When the amount of free space of the disk cache 136 decreases below a predetermined value, the data stored in the disk cache 136 is successively written into a tape medium (which may be referred to as "migration") (e.g., to storage device 138). The term space may refer to an available capacity of a storage device. Thus, if a storage device has 10 gigabytes but uses only 3 gigabytes, then the amount of free space is 7 gigabytes. A virtualization engine such as TS7700 may have multiple tape drives and performs migration to multiple tape media.

In general, the transfer rate at the time of data entering a disk cache 136 from a host 110 is greater than the transfer rate of migration to a storage device. There exists a mechanism (e.g., throttle 134) for managing a transfer from the CADD 130 to a disk cache 136 in order to avoid a situation where the disk cache 136 does not have free space when requested to read data from a tape medium (e.g., from the storage device 138). The throttle 134 can perform control so that the rate of transfer from a CADD 130 to the disk cache 136 does not become too fast while migration is being performed when the amount of free space of the disk cache 136 is below a predetermined value. The CADD 130 may have a buffer 132 that temporarily stores data from a FC adapter. The CADD 130 may transmit the data within the buffer 132 to the disk cache 136.

A possible configuration and flow of data/commands is described below with reference to FIG. 1. Channels (e.g., channels A and B) of a host 110 can be physically connected to ports (ports 0 and 1 of FC adapter 122, and FC adapter 124) of FC adapters within a hierarchical storage management system 120 via fibre channels. In general, a multipath configuration can be adopted, and a virtual device (in TS 7700, a virtual tape drive) provided by the hierarchical storage management system 120 can be accessed via any physical route.

In activity 1, data can be sent from the host 110 via a channel (Channel A) and is stored into the buffer 128 of FC adapter 122. The host 110 can store data on a virtual tape drive within a hierarchical storage management system. Aspects of the present disclosure are marked by a delay in a "device end" status returned from the FC adapter 122 to the host 110.

Activities 2a-5a illustrate the interaction between the host 110 and the hierarchical storage management system 120 without a delay introduced. Activities 2b-7b illustrate the interaction between the host 110 and hierarchical storage management system 120 with a delay introduced by a delay module 127. Although only one delay module 127 is shown on a single FC adapter, there may be multiple delay modules, one for each FC adapter. Alternatively, there may be a single delay module outside of the FC adapter.

In activity 2a, the FC adapter 122 returns an end message to the host 110. The end message can indicate that the host 110 can transmit the next command to the hierarchical storage management system 120. The end message can apply to the FICON® standard or the Fibre Channel Standard. For example, a FC adapter 122 using the FICON® standard may send the message "Device End" to the host 110. A FC adapter 122 using the Fibre Channel Standard may send the "Command Complete" message.

In activity 3a, the host 110 sends a CCW (Channel Command Word) to the virtual tape drive used in activity 1 and 2a to FC adapter 124 that can be different from the adapter used in activity 1 and 2a (e.g., FC adapter 122). In activity 4a, the FC adapter 124 sends a CON (Connection message) to the CADD 130. The CON is a declaration that the adapter is going to use a virtual device. However, since the virtual tape drive is currently used by FC adapter 122, a Busy message is returned from the CADD 130 to the FC adapter 124 in activity 5a. The FC adapter 124 returns a Busy status to the channel B.

When multiple virtual storage devices 138 are used and multiple users perform multiple write operations to the devices, the disk cache 136 can become full. When a storage level the disk cache 136 approaches a predetermined value, the data is transferred (i.e., migrated) from disk cache 136 to the storage device 138. During transferring data from disk cache 136 to a storage device 138, the transfer rate from buffer memory 132 to the disk cache 136 decreases. The decrease of the transfer rate from the buffer memory 132 to the disk cache 136 can further cause the transfer rate from buffer 128 to the buffer memory 132 to decrease. Thus, the CCW on channel B from the host to FC adapter 124 can reach the adaptor before data transfer from buffer 128 to buffer memory 132 of the CADD 130 is complete.

Because of significant increase in the number of usable virtual devices, a Busy status (i.e., status information indicating that a virtual device is used via another route and is not available currently) can be frequently transmitted from a hierarchical storage management system 120 to a host 110 when migration occurs while the amount of free space of a disk cache 136 decreases below a predetermined value.

A host 110 may use a different channel each time the host 110 sends a command to hierarchical storage management system 120 in order to equalize workloads on multiple channels.

The FC adapter 124 can be a separate hardware card than FC adapter 122, according to various embodiments. Aspects of the present disclosure call for modification to firmware of the FC adapter to introduce a delay pattern from the buffer 128. The FC adapter 122 may monitor the outflow from the buffer 128 to the buffer 132 and issue a prediction of the Disconnection message (DCON) from there. The DCON is a message sent from the FC adapter to the CADD 130 to indicate that the FC adapter 122 has completed the migration of data to the CADD 130.

A feature of the disclosure is a delay module 127 to modify the timing of the sending of a "device end" status message to the host 110. For instance, a delay module 127 can be added to the FC adapter 122. The delay module 127 can be responsible for delaying the end device status to the host 110 based on the transfer rate between the buffer 128 and the buffer 132. In activity 2b, the FC adapter 122 returns a status called Device End to the host 110. (This indicates that the host can transmit the next command to the storage). Activity 2b can be delayed by the delay module 127 as discussed further herein.

Based on the timing modifications of activity 2b, a CCW from the host 110 to FC adapter 124 can be timed based on a DCON to the CADD 130 which may mitigate the busy status in activity 3a. For example, with a delayed "device end" status, the CADD 130 is notified that the FC adapter 122 ends the use of the virtual device, and the host 110 can use the virtual device via another adapter (e.g., FC adapter 124). The delay may enable the buffer 132 to release a portion of its data to the disk cache 136 to free capacity and enable the FC adapter 124 to connect to the CADD 130.

If migration restricts the rate of transfer from the buffer 132 to the disk cache 136, the time until the FC adapter 122 sends a DCON to the CADD 130 relative to when the FC adapter 124 returns a status called Device End to the host 110 is elongated (e.g., activity 2a). Therefore, the timing of the host 110 sending a CCW (Channel Command Word) to the virtual tape drive used before (e.g., storage device 138), to a FC adapter 122 is different from the FC adapter 124, which conventionally comes after the DCON is sent.

In activity 3b, the FC adapter 122 completes transfer of the data stored in the buffer 128 to a buffer 132 of the CADD 130. In activity 4b, the data on the buffer 132 of the CADD 130 is written to a disk cache 136. As mentioned, the data transfer between the CADD 130 and the disk cache 136 may operate asynchronous with the data that is transferred between FC adapter 122 and the CADD 130. In activity 5b, FC adapter 122 sends a DCON (Disconnection message) to the CADD 130. Thereby, the CADD 130 is notified that FC adapter 122 ends the use of the virtual device, and the host 110 can use the virtual device via another adapter (e.g., FC adapter 124).

In general, activities 1b-5b represents a sequence for a particular FC adapter and a host sending a CCW and a FC adapter sending a CON are regarded as the first activities in a new data transfer sequence. For example, in activity 6b, the host 110 sends a CCW (Channel Command Word) to FC adapter 124 via channel B which differs from a CCW sent to FC adapter 122. Continuing the example, in activity 7b, FC adapter 124 sends a CON (Connection message) to the CADD 130. The CON is a declaration that FC adapter 124 is going to use the virtual device.

In various embodiments, data sent from the host 110 via a channel A can be stored into the buffer 128 of the FC adapter 122. The FC adapter 122 can complete transfer of the data stored in the buffer 128 to a buffer 132 of the CADD 130. The data on the buffer 132 of the CADD 130 is written to a disk cache 136. The FC adapter 122 can send a DCON (Disconnection message) to the CADD 130 where the CADD 130 is notified that the FC adapter 122 ends the use of the virtual device, and the host 110 can use the virtual device via the same or another FC adapter. The DCON can be predicated based on the transfer rate of the buffer 128 to the buffer 132. Using this procedure, a busy status does not occur because Device End status is returned closer in time proximity to DCON. On the other hand, the FC adapter 122 may have no data to transfer to a buffer 132 of the CADD 130 just after the FC adapter 122 sends a DCON to receive new data from channel B. There can be a long time window that FC adapter 122 is idle which can cause the host to sit idle when waiting to receive a device end message from the hierarchal storage system. In other words, data transfer from the host may be unnecessarily slowed down if there was no migration of data from disk cache to physical storage.

Alternatively, the FC adapter 122 returns a status called Device End to the host 110 before the FC adapter 122 completes transfer of the data stored in the buffer 128 to a buffer 132 of the CADD 130. The FC adapter 122 may start transfer of the data stored in the buffer 128 to a buffer 132 of the CADD 130 before the FC adapter 122 returns a Device End status to the host 110, i.e., the specific order of the activities may occur in any order. The timing to complete transfer of the data stored in the buffer 128 to a buffer 132 of the CADD 130 may occur after that the FC adapter 122 returns a status called Device End to the host 110.

Figure 2:
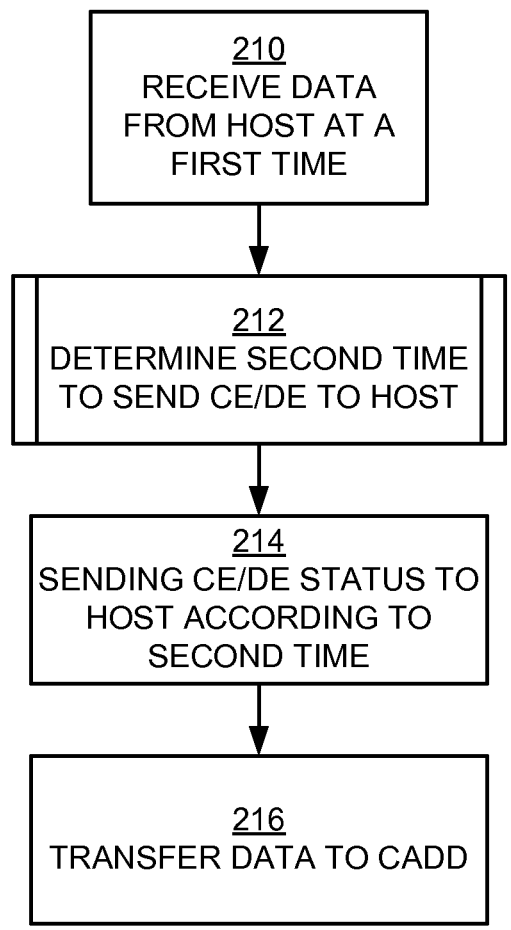
FIG. 2 illustrates a flowchart of a method for managing the transmission of an end status to a host, according to various embodiments.

FIG. 2 illustrates a flowchart of a method 200 for managing the transmission of an end status to a host, according to various embodiments. Aspects of the method 200 are for an FC adapter and can involve receiving data from a host, determining a delay for a device end, sending the status to the host based on the delay, and transferring data to the CADD. Aspects of the present disclosure may specifically relate to the determining the delay for a device end message and sending the status to the host based on the delay. The method 200 may begin at operation 210.

Although not depicted, the FC adapter can transmit a first data to a buffer of a CADD at a buffer memory transfer rate. In embodiments, the CADD may aggregate data from at least two FC adapters to send to a disk cache in a hierarchical storage management system. A host can initiate a channel connection between the host and a port of the FC adapter. Once initiated, the host can transmit the first data to the FC adapter. An aspect of the present disclosure is that the timing of a FC adapter returning a Device End status to a host is modified to be based off of the rate of data transfer from an SBM of the adapter to a buffer of a CADD.

In operation 210, the FC adapter can receive a second data from a host at a first time. The second data can be various packets that are distinct from the first data. The second data can be received as a result of a channel session from the host. For example, a first channel session can provide the first data to the FC adapter, which is then processed, and a second channel session can provide the second data to the FC adapter. The first time may be punctuated by a counter or a system clock for whenever the second data is received.

In operation 212, the FC adapter can determine a second time to send a device end status to the host. The device end status closes a channel from the host to the first adapter. In various embodiments, although a "Device End" status may be used throughout this discussion. A "Device End" status corresponds with a FICON® protocol. FC adapters using a Fibre Channel Standard may transmit a "Command Complete" message to the host.

The second time may be different than the first time. For example, the second time may be temporally later than the first time. The difference between the first time and the second time is the delay. The delay may be longer than a processing time to process the second data with the FC adapter. For example, if the FC adapter takes an average of 5 ms to process 5 megabytes of data, then the second time may be greater than 5 ms for 5 megabytes of data. In embodiments, the device end may not be required to be sent later than the next CCW. For example, if the turnaround time between when the host receives the device end and when the host sends the next CCW is relatively long, then the FC adapter can send the device end at substantially the same time as it receives the first data. The FC adapter may still have plenty of time to transfer the data to the CADD buffer before the host sends the next CCW. The FC adapter can determine the second time based on the expected time of the FC adapter sending a DCON to the CADD. Aspects of operation 212 are described further herein.

In operation 214, the FC adapter can send the device end status to the host at the second time through the first port. The device end status, as mentioned, can close the channel between the host and the FC adapter and allow the host to transmit data to the hierarchical storage management system via another FC adapter. The FC adapter may continue to hold the second data in the buffer memory for transfer to the CADD.

In operation 216, the FC adapter can transfer the second data to the buffer of the channel adapter device driver. A feature of this disclosure is that the transfer of the second data can occur while maintaining the buffer memory transfer rate from the transfer of the first data. The buffer memory transfer rate is defined from a buffer memory from the first adapter to the channel adapter device driver. In addition, the transfer rate from the CADD to the disk cache can also be maintained meaning that the delay introduced in operation 212 does not significantly affect the transfer rate from the CADD to the disk cache.

Figure 3:
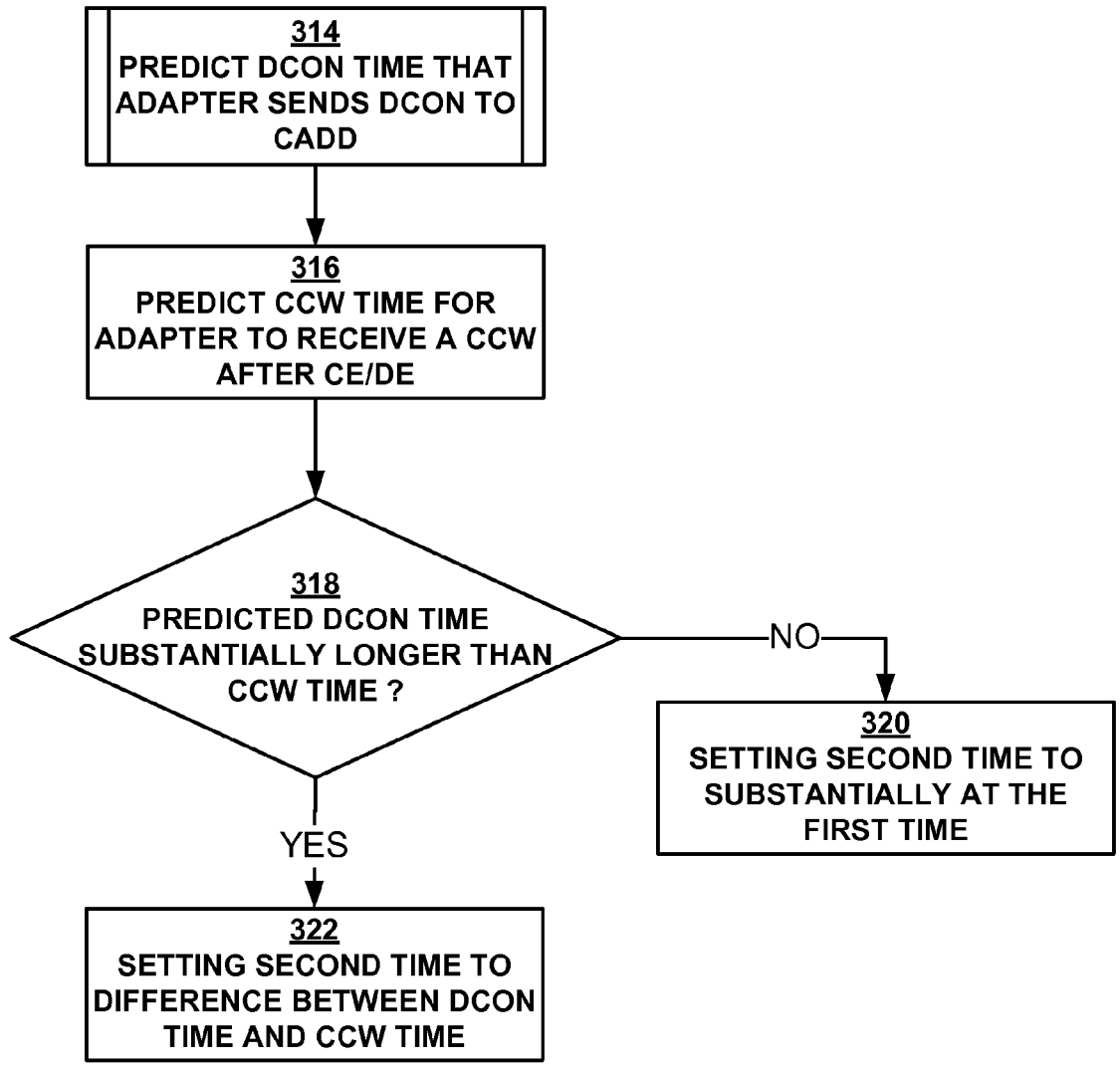
FIG. 3 illustrates a method of determining a second time to send a device end status to the host, according to various embodiments.

FIG. 3 illustrates a method 300 of determining a second time to send a device end status to the host. The method 300 can correspond to operation 212 in FIG. 2 as discussed herein. The method 300 can be implemented by an FC adapter. More specifically, a delay module of a FC adapter can be introduced to determine the delay. For instance, the delay can be based on a relationship of the time that the FC adapter is predicted to send a DCON to the CADD and the time for the FC adapter to receive a CCW from the host. The method 300 can begin at operation 314.

In operation 314, the delay module can predict a disconnection message time that the first FC adapter sends the disconnection message to the channel adapter device driver. The disconnection message indicates that the first adapter ends the use of a virtual device within the hierarchal storage management system (e.g., by freeing the channel used by the host) and that the host can use the virtual device via the second FC adapter. The DCON time can be predicted based on a buffer memory transfer rate to the CADD and may also include using a weighted average of a buffer memory transfer rate. This DCON time may be based on the transfer rates between the buffer memory and the CADD and the CADD transfer rates from the CADD to as disk cache. The prediction of the DCON time is discussed further herein.

In operation 316, the delay module can predict a channel command word (CCW) time for the second FC adapter to receive the channel command word after the device end status. The channel command word is an instruction to a specialized input output (I/O) channel processor (e.g., the FC adapter) to initiate an I/O operation. In various embodiments, the specialized I/O channel processor may be similar in scope to the control unit of the FC. In embodiments, the delay module can predict a CCW time based on the past differences between a time a device end status is provided to the host and a time a CCW is received with the same or different FC adapter. For example, an FC adapter can provide a device end status to a host and the host can establish a new channel on a different port of the FC adapter.

In various embodiments, the delay module of one FC adapter can communicate with the host in order to determine the time the CCW is provided to another FC adapter. In various embodiments, the delay module can communicate with multiple FC adapters in order to determine when a CCW is received by a second FC adapter. The estimation can also be based on a time difference between a prior device end status from a FC adapter and a next CCW from a different FC adapter.

In embodiments, a FC adapter may store a historical time of the FC adapter and return a device end status called to the host. The FC adapter can store the time of that the host sends a CCW (Channel Command Word) to the FC adapter. The time difference between the time stored in the FC adapter to send a device end status and the time stamped by the host when the CCW is sent can offer a prediction of the CCW time. Alternatively, the time stamp of when the CCW was received by a FC adapter may be used.

In operation 318, the delay module can determine whether the predicted disconnection message time is substantially longer than the predicted channel command word time. In order to perform this operation, the delay module can perform a comparison between the predicted DCON time and the predicted CCW time. The predicted DCON time can be substantially longer than the predicted CCW time if the DCON time is beyond a variance threshold previously set by an administrator. For example, if the DCON time is 6 ms and the CCW time is 5 ms, but the variance threshold is plus or minus 4 ms, then the DCON time would not be substantially longer than the CCW time. However, if the DCON time is 7 ms and the CCW time is 5 ms, and the variance threshold is plus or minus 1 ms, then the DCON time is substantially longer than the CCW time.

The delay module can determine the difference between the DCON time and the CCW time, i.e., the delay time, to predict whether the DCON time is substantially longer than the CCW time using the example formula:

$$D = T_d - T_c * \alpha$$

Where D is the timing delay relative to an undelayed timing (i.e., operation 320). $T_d$ represents the estimated time period for an FC adapter to return the DCON status to the CADD after receipt of data from the Host, which can be determined in operation 314 (and further described in FIG. 4). $T_c$ represents the time period ending when the host sends the CCW status after a Device End message is sent to the Host. $\alpha$ can be a constant that is equal to or smaller than 1 which is further determined on the basis of a value (e.g., a standard deviation of $T_c$) in consideration of a fluctuation of the value of $T_c$. D may be a difference value that is used to determine whether the device end needs to be delayed. For example, if D is negative, then no delay would be needed. If D is positive, then a delay would be needed.

In operation 318, the example formula may be used to determine whether the predicted DCON time period is substantially longer than the CCW time period. For example, if the value of D is zero or negative (when typical time until the next CCW reaches the adapter after the adapter returns a Device End status to the host), then the predicted DCON time may not be substantially longer than the CCW time and FC adapter can return the Device End status to the host immediately after data sent from the host in operation 320 without increasing the likelihood of a busy message being generated. On the other hand, if the value of D is positive, the timing of the adapter returning the Device End status to the host may be delayed in comparison with the conventional timing so that the likelihood of generating a busy message is not increased. Although the width of the delay is preferably D, the timing may be immediately before or immediately after the adapter sends a DCON to the CADD to facilitate the implementation.

In operation 320, the delay module, in response to the predicted DCON time not being substantially longer than the CCW time, can set the second time substantially at the first time. In other words, the FC adapter can send a Device End message ("second time") at a time that is substantially the same as the time the FC adapter receives data from the Host ("first time"). The second time can be substantially at the first time when the second time is set to first time plus any processing time of the FC adapter. The second time can also be within a processing threshold of the first time. In operation 320, if the predicted DCON time of a first FC adapter is not substantially longer than the CCW time of a second FC adapter, then there would not necessarily be any busy status returned by the second FC adapter and therefore no reason to delay the device end status to the host.

In operation 322, the delay module can set, in response to determining that the predicted disconnection message time is substantially longer than the predicted channel command word time, the second time to a difference between the disconnection message time and the channel command word time.

For example, if the predicted DCON time is 40 ms after the first time (when the adapter received data from the Host), and the time the CCW is received from the Host is 23 ms after the time the adapter send a Device End message to the Host, then the time when the FC adapter sends a Device End Status message may be set to 17 ms after the first time. Since the host may be affected by the device end status by delaying a CCW message to the hierarchical storage management system (e.g., in order to reduce the instance of a busy status), then delaying the device end status by the difference may produce enough delay for the DCON to "catch up" to the expected CCW time. In various embodiments, the delay between the first and the second time may be set to the difference between the DCON time and the CCW time while accounting for any processing within the FC adapter.

In various embodiments, the second time may also be set to a point in time before the predicted CCW time but after an expected time for the FC adapter to transmit the DCON message. For example, if the predicted DCON time is 20 ms after the first time, and the CCW time is 23 ms after the first time, then the second time may be set to 20 ms after the first time.

As described above, by changing the timing of returning a "Device End" status to the host according to the rate of data transfer from the buffer memory of the adapter to the buffer of the CADD, a virtual device may be available to any FC adapter when the host sends a CCW to the virtual device that the host used before. Therefore, it may be possible to reduce or eliminate the occurrence of a busy status on a different channel that a host used before. Thereby, it is possible to avoid a burden from being imposed on an FC Switch in a SAN caused by excessive exchanges of statuses and commands between the host and the storage via the SAN and avoid useless decrease in performance for other devices using the SAN.

Figure 4:
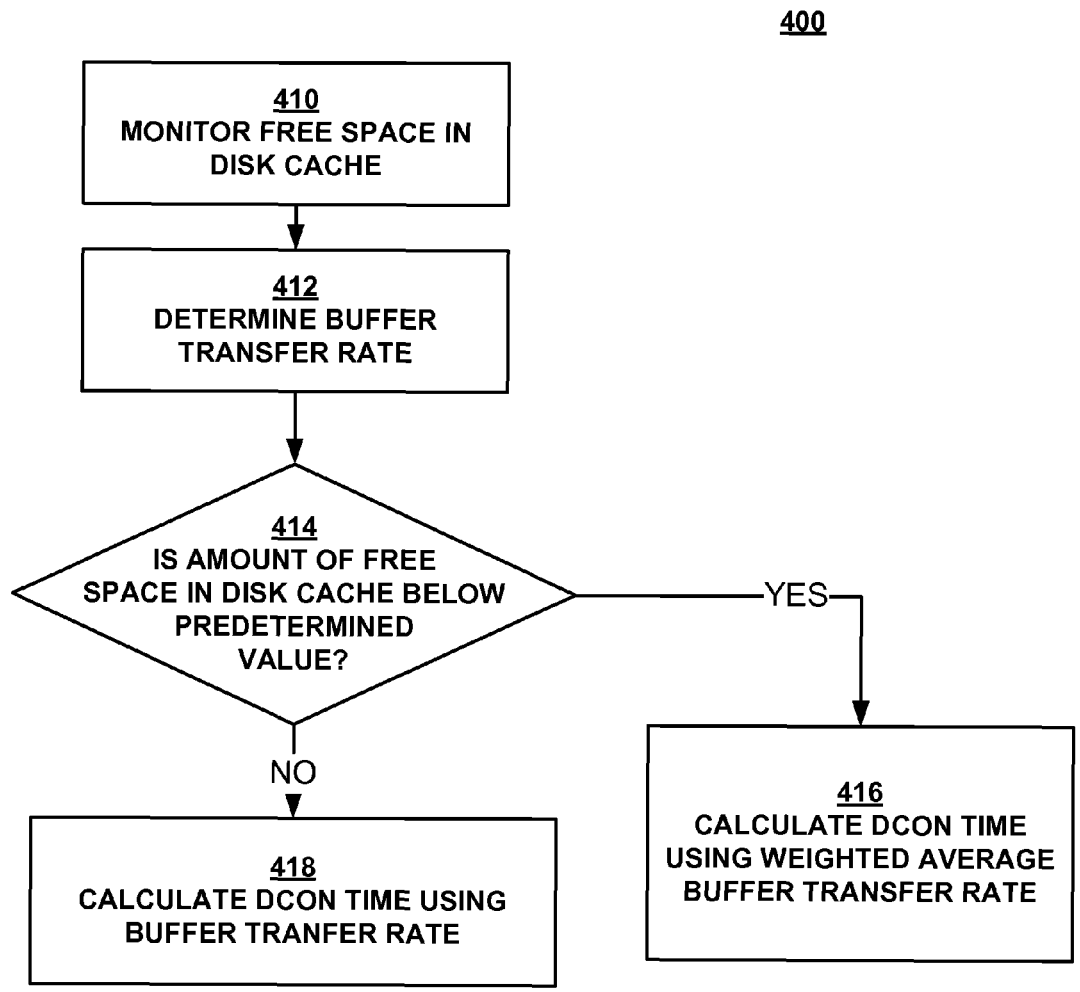
FIG. 4 illustrates a method of predicting Disconnect Message (DCON) time for a Fibre Channel (FC) adapter to send a DCON status to the Channel Adapter Device Driver (CADD), according to various embodiments.

FIG. 4 illustrates a method 400 of predicting DCON time for an FC adapter to send a DCON status to the CADD, according to various embodiments. Aspects of method 400 can correspond to operation 314 in FIG. 3. Aspects of the method 400 can involve determining whether to use a weighted average of the buffer memory transfer rate or the actual buffer memory transfer rate. The method 400 may begin at operation 410.

In operation 410, the hierarchical storage management system can monitor an amount of free space in the disk cache. The disk cache free space may be communicated to the FC adapter for the purposes of predicting when the disk cache will be full.

In operation 412, the FC adapter can determine, via the control unit, a first transfer rate from a buffer memory of the first FC adapter to the channel adapter device driver. The first transfer rate may indicate the rate of data that is transferred between the FC adapter and the CADD.

A hierarchical storage management system provides as many as hundreds of virtual devices to the host, and the buffer memory of the FC adapter is shared by the virtual devices. When data management of the buffer memory at the time of writing data from the host to the storage is First-In, First-Out (FIFO), the time $T_d$ (which represents the time until the FC adapter sends a DCON to the CADD after data sent from the host via a channel is stored into the buffer memory of the FC adapter of the hierarchical storage management system) can be expressed by the following formula:

$$T_d = S/R$$

S is a total amount of data waiting to be written into the buffer of the CADD at the time point of the data being stored into the buffer memory (i.e., the queued data) and R is a transfer rate at the time of writing from the buffer memory to the buffer of the CADD.

Here, the value of the transfer rate R at the time of writing from the buffer memory to the buffer of the CADD can be significantly influenced by the amount of free space of the disk cache in the hierarchical storage management system and a separate transfer rate of migration from the disk cache to the storage device (e.g., a tape medium). In some circumstances, a past average transfer rate would not be used but rather a weighted average transfer rate which attaches more importance to the latest state as the value of R.

In operation 414, the FC adapter can determine whether the amount of free space in the disk cache is below a predetermined value. The predetermined value may be set based off of administrator preferences. For example, the predetermined value can be based off of a percentage of utilization of the disk cache. The predetermined value can be based off of an expected time. For example, if the predetermined value is 5 gigabytes (GB), and the time to transfer 5 GB to a tape drive is 30 seconds, then the fact that there is 6 GB in the disk cache may indicate that the time to transfer may take more than 30 seconds.

Therefore, the determining in operation 414 can calculate a transfer rate R' that is based on a transfer rate $R_m$ of migration of the FC adapter and a total number of FC adapters, N, that the hierarchical storage management system has in the following formula:

$$R' = R_m/N$$

Therefore, the transfer rate R' may indicate the average transfer rate from all adapters. The FC adapter may communicate with other FC adapters to have visibility on other FC adapter transfer rates to the CADD.

In operation 416, if the amount of free space in the disk cache is below a predetermined value, then the FC adapter can calculate the disconnection message time period using a weighted average buffer memory transfer rate. The weighted average buffer memory transfer rate is based on a greater weight of a most recent determination buffer memory transfer rate. For example, if the three most recent transfer rates are 1 GB/s at a first time period, 2 GB/s at a second time period, and 3 GB/s at a third (most recent) time period, then the weighted average buffer memory transfer rate may give more weight (e.g., 50%) to the third time period, 20% weight to the second time period, and 10% weight to the first time period.

In operation 418, the FC adapter can calculate the DCON time using the buffer memory transfer rate. If the amount of free space in the disk cache is not below a predetermined value, then there may be enough free space to accommodate the transfer of data from the CADD to the disk cache at a particular rate. Assuming that the particular rate is unchanged, then the DCON time can be predicted based on the rate of outflow from the buffer memory of the FC adapter without using a weighted average.

Figure 5:
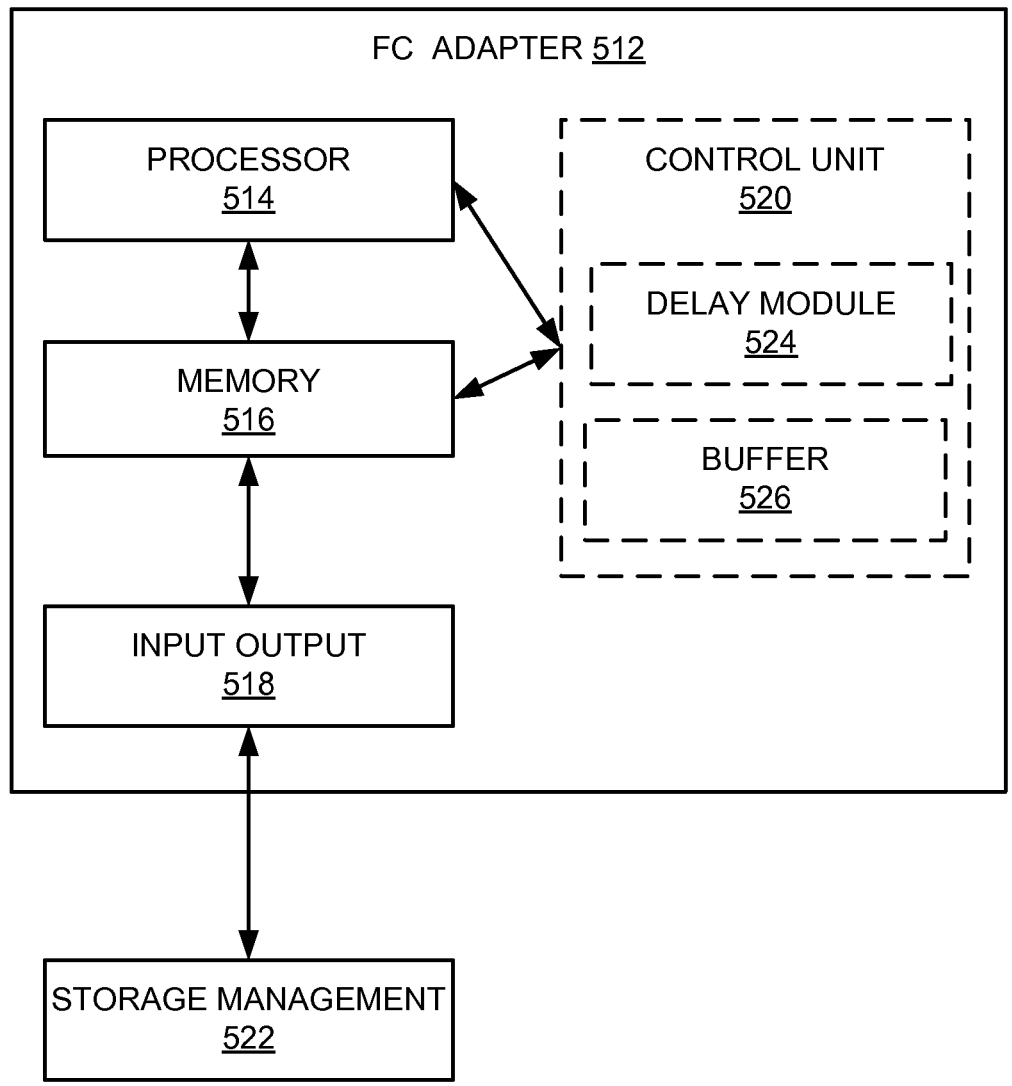
FIG. 5 illustrates an example of interaction between the FC adapter and a hierarchical storage management system, according to various embodiments.

FIG. 5 illustrates an example of interaction between the FC adapter 512 and a hierarchical storage management system 522, according to various embodiments. The FC adapter 512 may be a physical card that attaches to the hierarchical storage management system 522. Aspects of the present disclosure may be performed by the control unit 520. The control unit 520 may be a series of instructions that control how the FC adapter manages various ports on the FC adapter 512. The control unit 520 may have a delay module 524 that manages an amount of delay to a device end message to the host (as described herein). The series of instructions may be executed by the processor 514 of the FC adapter 512. The delay module 524 may need to access data that is obtained from the operation of the FC adapter. This data may be stored in memory 516 and executed by the processor 514. The memory 516 may be utilized for a buffer 526. The processor 514 may further be communicatively coupled to an input output 518 to communicate with the hierarchical storage management system 522. The performance of the hierarchical storage management system 522 coupled with the FC adapter 512 may be improved due to a reduction of busy status between the FC adapter 512 and the host.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 6:
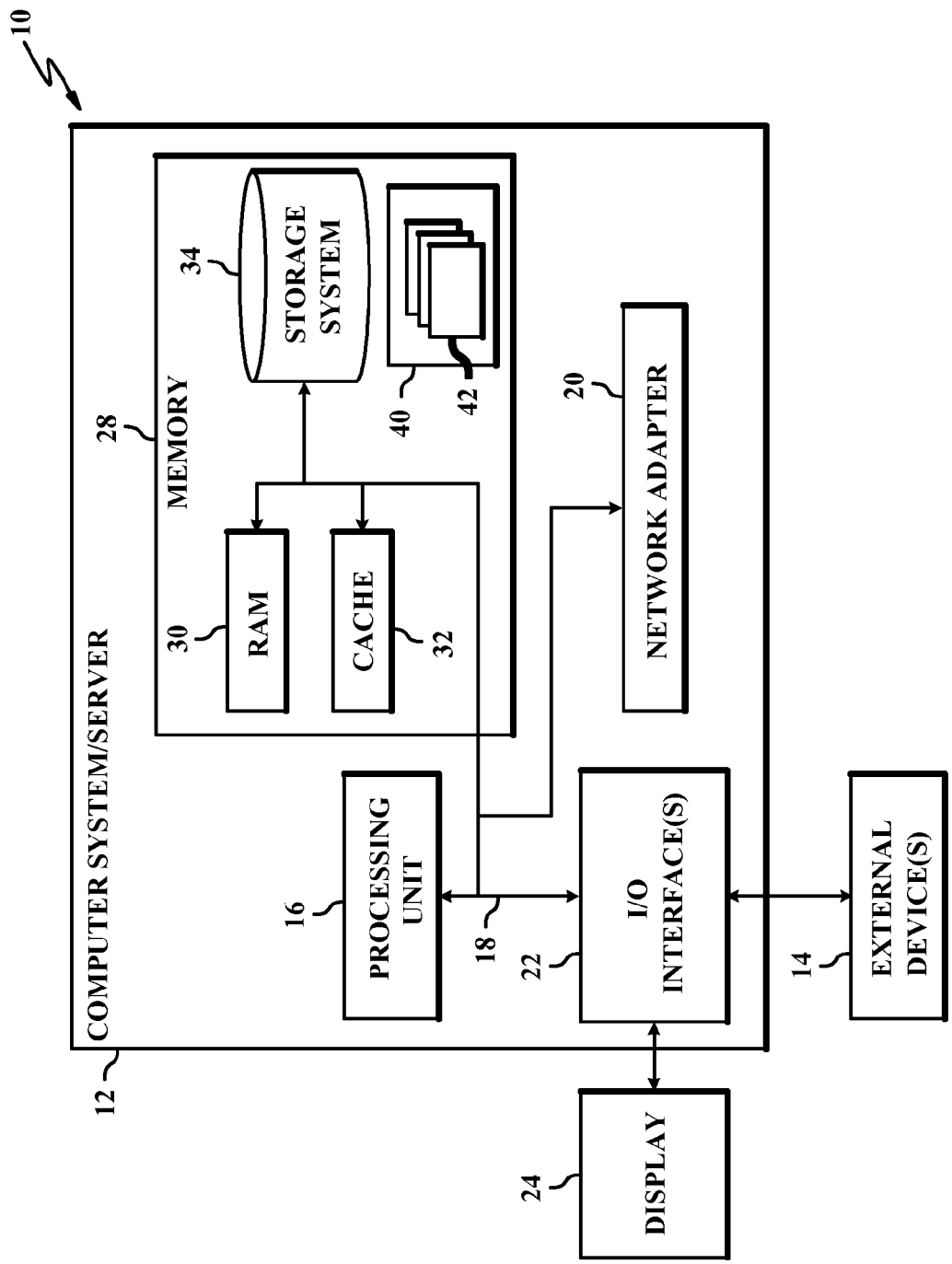
FIG. 6 depicts a cloud computing node, according to various embodiments.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
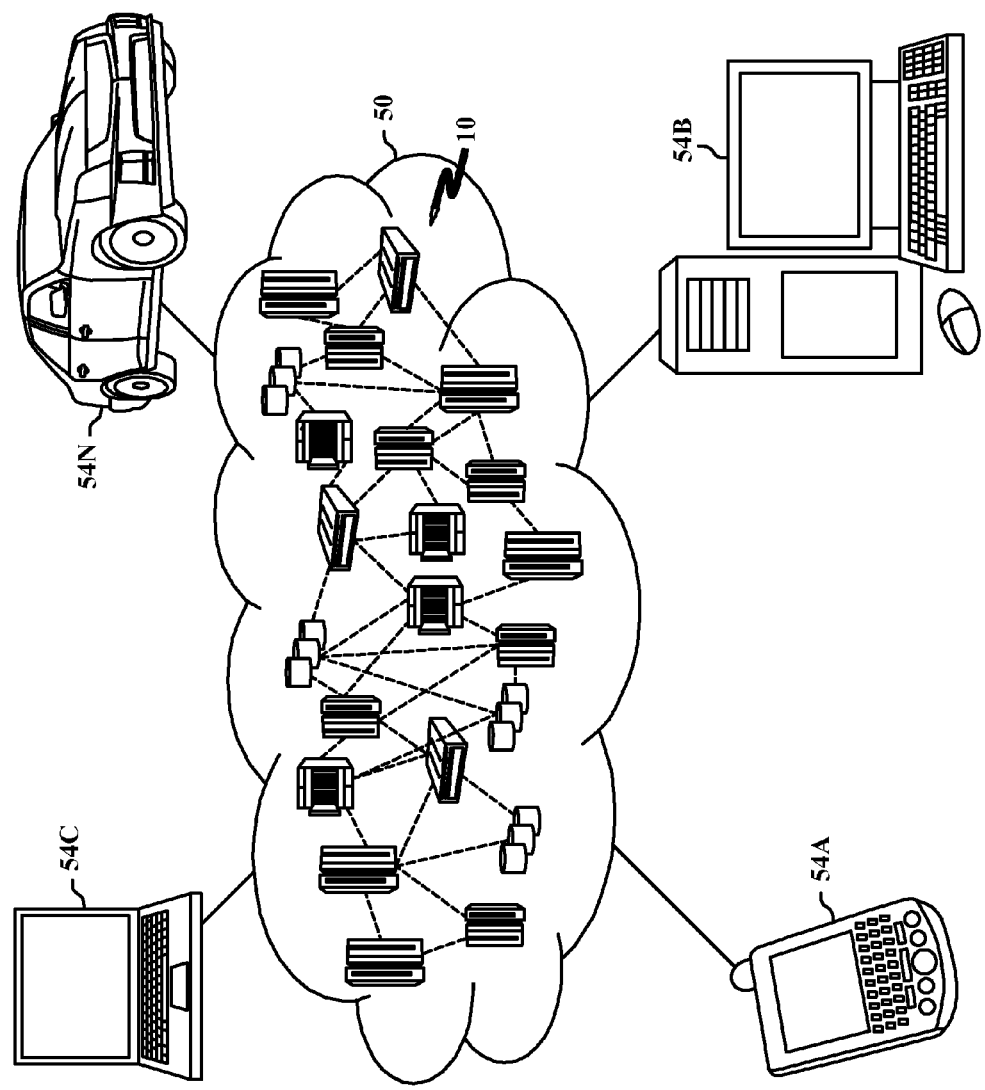
FIG. 7 depicts a cloud computing environment, according to various embodiments.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
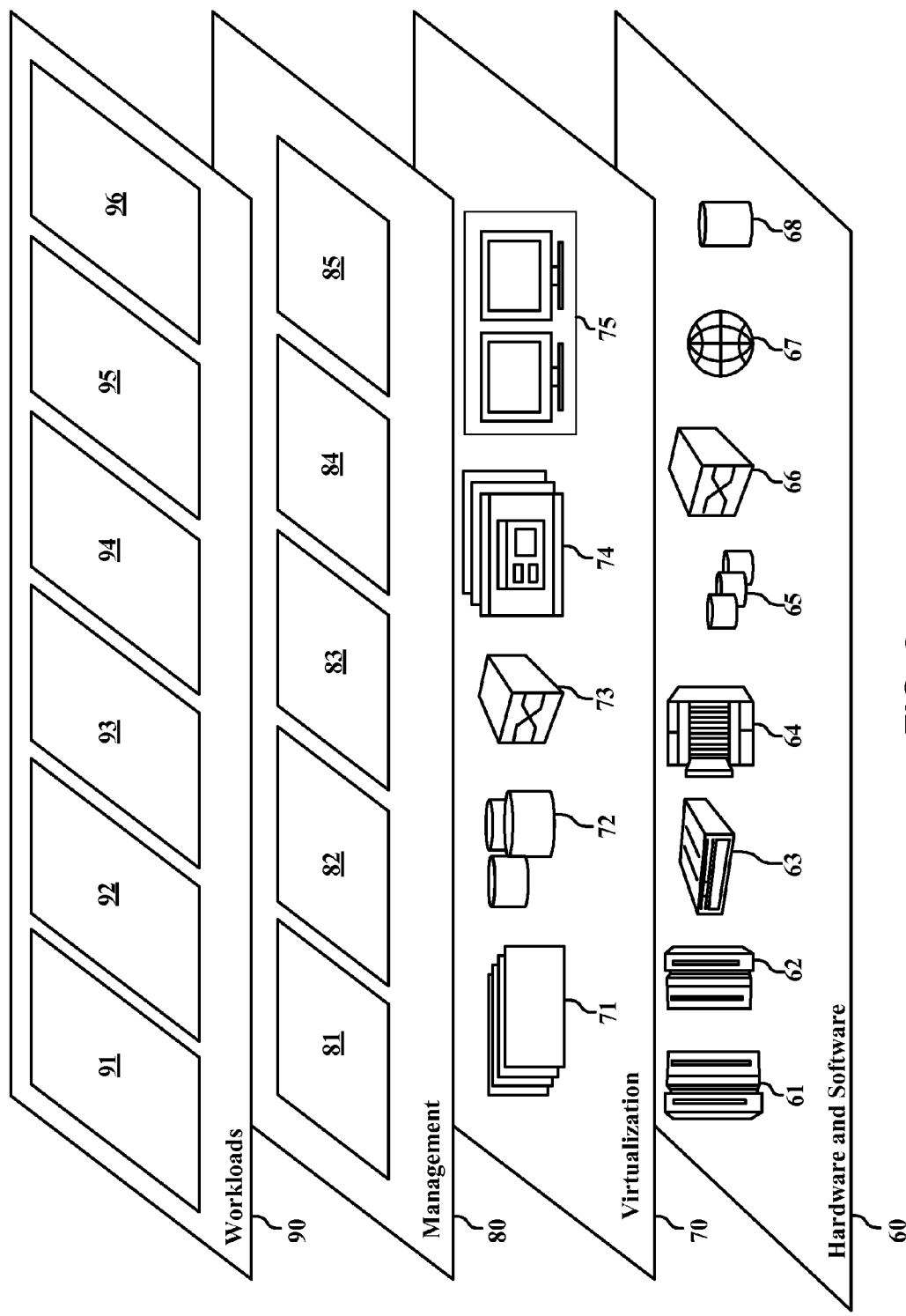
FIG. 8 depicts abstraction model layers, according to various embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

Aspects of the present disclosure relate to the virtualization layer 70, more specifically the virtualization of virtual storage 72 such as tape drives.

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
    transmitting a first data from a first adapter to a buffer associated with a channel adapter device driver at a buffer memory transfer rate, the channel adapter device driver aggregates data from at least the first adapter and a second adapter to send to a disk cache in a hierarchal storage management system;
    receiving a second data at a first port of the first adapter from a host at a first time;
    determining a second time to send a device end status to the host, the device end status closes a channel from the host to the first adapter, wherein determining the second time to send the device end status to the host includes:
        predicting a disconnection message time that the first adapter sends the disconnection message to the channel adapter device driver, the disconnection message indicates that the first adapter ends a use of a virtual device within the hierarchal storage management system and that the host can use the virtual device via the second adapter,
        predicting a channel command word time for the second adapter to receive the channel command word after the device end status, the channel command word is an instruction to a specialized I/O channel processor to initiate an I/O operation,
        determining that a predicted disconnection message time is substantially longer than a predicted channel command word time, and
        setting, in response to determining that the predicted disconnection message time is substantially longer than the predicted channel command word time, the second time to a difference between the disconnection message time and the channel command word time;
    sending the device end status to the host at the second time through the first port; and
    transferring the second data from the first adapter to the buffer associated with the channel adapter device driver.

2. The method of claim 1, wherein predicting the disconnection message time includes:
    monitoring an amount of free space in the disk cache;
    determining a first transfer rate from a buffer memory of the first adapter to the channel adapter device driver;
    determining whether the amount of free space in the disk cache is below a predetermined value; and
    calculating the disconnection message time using a weighted average buffer memory transfer rate.

3. The method of claim 2, wherein the weighted average buffer memory transfer rate is based on a greater weight of a most recent determination buffer memory transfer rate.

4. The method of claim 2, wherein the buffer memory of the first adapter is a sequence buffer memory.

5. The method of claim 1, wherein transferring the second data from the first adapter to the buffer associated with the channel adapter device driver occurs while maintaining the buffer memory transfer rate.

6. The method of claim 1, wherein the buffer memory transfer rate is defined from a buffer memory from the first adapter to the channel adapter device driver.

7. A system, comprising:
    a processor;
    a memory;
    a control unit communicatively coupled to the processor and memory and configured to:
        transmit a first data from a first adapter to a buffer associated with a channel adapter device driver at a buffer memory transfer rate, the channel adapter device driver aggregates data from at least the first adapter and a second adapter to send to a disk cache in a hierarchal storage management system;
        receive a second data at a first port of the first adapter from a host at a first time;
        determine a second time to send a device end status to the host, the device end status closes a channel from the host to the first adapter, wherein determining the second time to send the device end status to the host includes:
            predicting a disconnection message time that the first adapter sends the disconnection message to the channel adapter device driver, the disconnection message indicates that the first adapter ends a use of a virtual device within the hierarchal storage management system and that the host can use the virtual device via the second adapter,
            predicting a channel command word time for the second adapter to receive the channel command word after the device end status, the channel command word is an instruction to a specialized I/O channel processor to initiate an I/O operation,
            determining that a predicted disconnection message time is substantially longer than a predicted channel command word time, and
            setting, in response to determining that the predicted disconnection message time is substantially longer than the predicted channel command word time, the second time to a difference between the disconnection message time and the channel command word time;
        send the device end status to the host at the second time through the first port; and
        transfer the second data from the first adapter to the buffer associated with the channel adapter device driver.

8. The system of claim 7, wherein predicting the disconnection message time includes:
    monitoring an amount of free space in the disk cache;
    determining a first transfer rate from the memory of the first adapter to the channel adapter device driver;
    determining whether the amount of free space in the disk cache is below a predetermined value; and
    calculating the disconnection message time using a weighted average buffer memory transfer rate.

9. The system of claim 8, wherein the weighted average buffer memory transfer rate is based on a greater weight of a most recent determination buffer memory transfer rate.

10. The system of claim 8, wherein the memory of the first adapter is a sequence buffer memory.

11. The system of claim 8, wherein the memory of the first adapter is a multi-buffer memory.

12. The system of claim 7, wherein the buffer memory transfer rate is defined from a buffer memory from the first adapter to the channel adapter device driver.

13. The system of claim 7, wherein the system is part of a hierarchical storage management system.

14. A computer program product for managing a fibre channel adapter comprising a computer readable storage device having a computer readable program stored therein, wherein the computer readable program, when executed on a computing device, causes the computing device to:
transmit a first data from a first adapter to a buffer associated with a channel adapter device driver at a buffer memory transfer rate, the channel adapter device driver aggregates data from at least the first adapter and a second adapter to send to a disk cache in a hierarchal storage management system;
receive a second data at a first port of the first adapter from a host at a first time;
determine a second time to send a device end status to the host, the device end status closes a channel from the host to the first adapter, wherein determining the second time to send the device end status to the host includes:
predicting a disconnection message time that the first adapter sends the disconnection message to the channel adapter device driver, the disconnection message indicates that the first adapter ends the use of a virtual device within the hierarchal storage management system and that the host can use the virtual device via the second adapter,
predicting a channel command word time for the second adapter to receive the channel command word after the device end status, the channel command word is an instruction to a specialized I/O channel processor to initiate an I/O operation,
determining that a predicted disconnection message time is substantially longer than a predicted channel command word time, and
setting, in response to determining that the predicted disconnection message time is substantially longer than the predicted channel command word time, the second time to a difference between the disconnection message time and the channel command word time;
send the device end status to the host at the second time through the first port; and
transfer the second data from the first adapter to the buffer associated with the channel adapter device driver.

15. The computer program product of claim 14, wherein predicting the disconnection message time includes:
monitoring an amount of free space in the disk cache;
determining a first transfer rate from a buffer memory of the first adapter to the channel adapter device driver;
determining whether the amount of free space in the disk cache is below a predetermined value; and
calculating the disconnection message time using a weighted average buffer memory transfer rate.

16. The computer program product of claim 15, wherein the weighted average buffer memory transfer rate is based on a greater weight of a most recent determination buffer memory transfer rate.

17. The computer program product of claim 15, wherein the buffer memory of the first adapter is a sequence buffer memory.

* * * * *